Oct. 27, 1970     P. T. SCHURMAN ET AL     3,536,435
PLASTIC CONTAINER AND BLOW MOLDING METHOD
Filed Feb. 24, 1969                    5 Sheets-Sheet 1
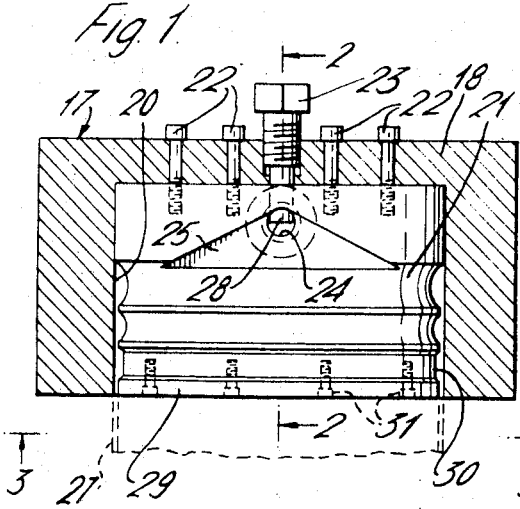
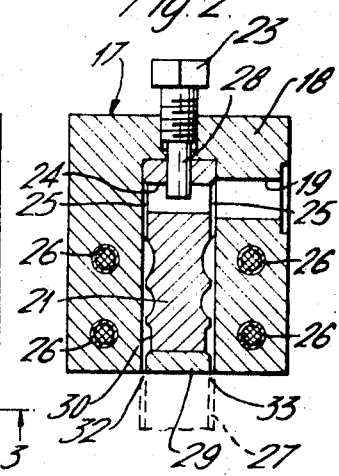
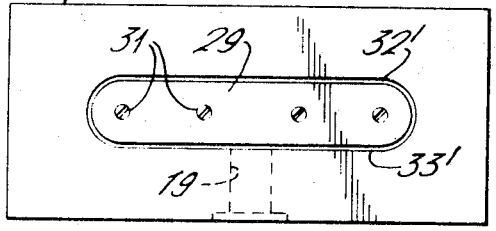
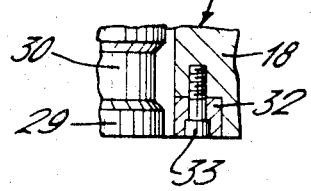
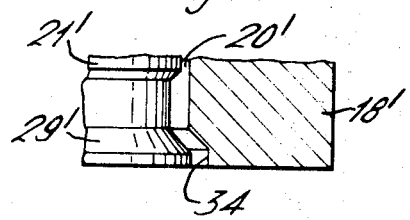
INVENTORS
PETER T. SCHURMAN
RAYMOND C. CONFER
BY *Edward J. Hanning*
ATTORNEY

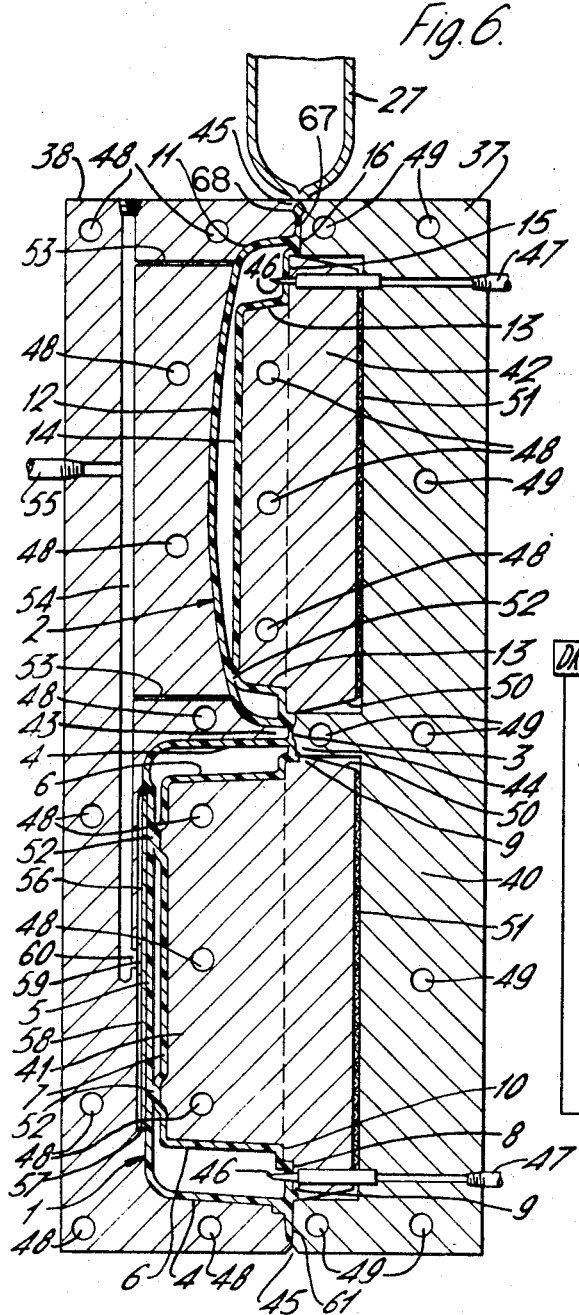
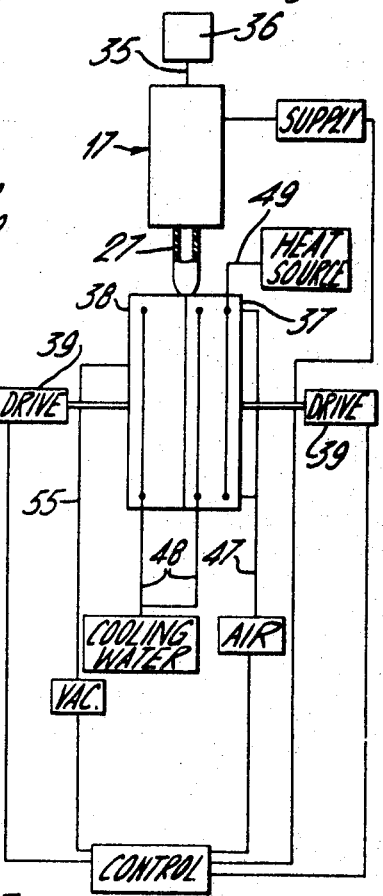

Oct. 27, 1970  P. T. SCHURMAN ET AL  3,536,435
PLASTIC CONTAINER AND BLOW MOLDING METHOD
Filed Feb. 24, 1969  5 Sheets-Sheet 3
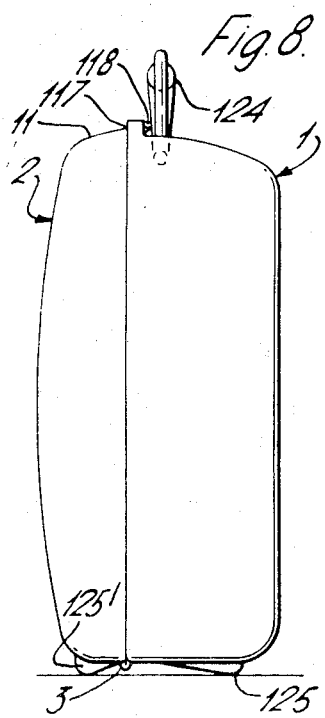
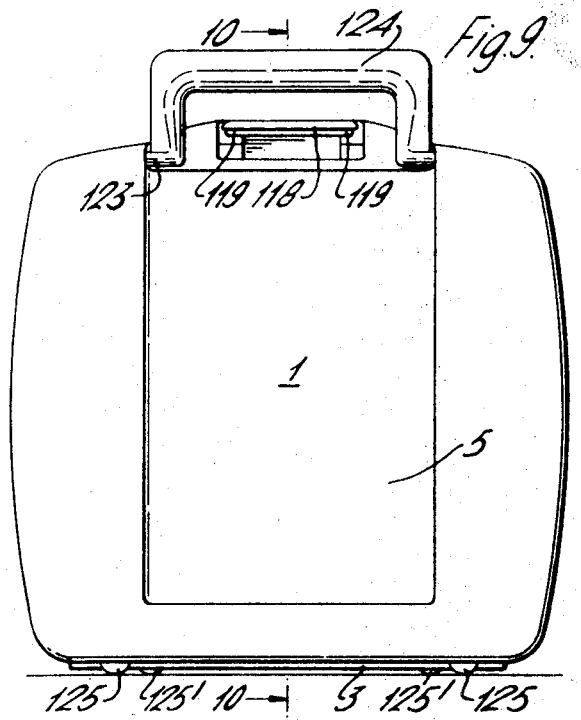
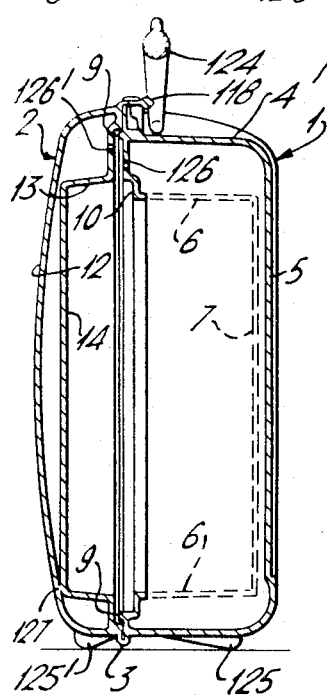
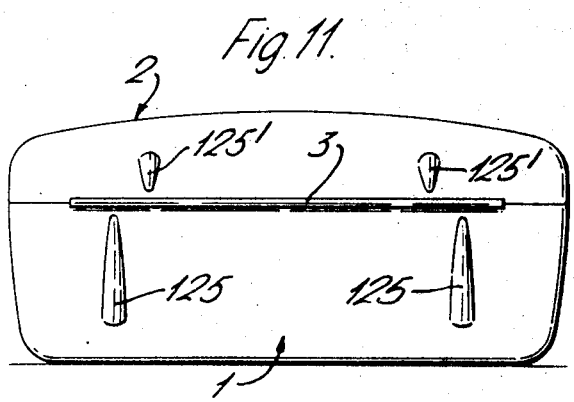
INVENTORS
PETER T. SCHURMAN
RAYMOND C. CONFER
BY
ATTORNEY Oct. 27, 1970   P. T. SCHURMAN ET AL   3,536,435
PLASTIC CONTAINER AND BLOW MOLDING METHOD
Filed Feb. 24, 1969                     5 Sheets-Sheet 4
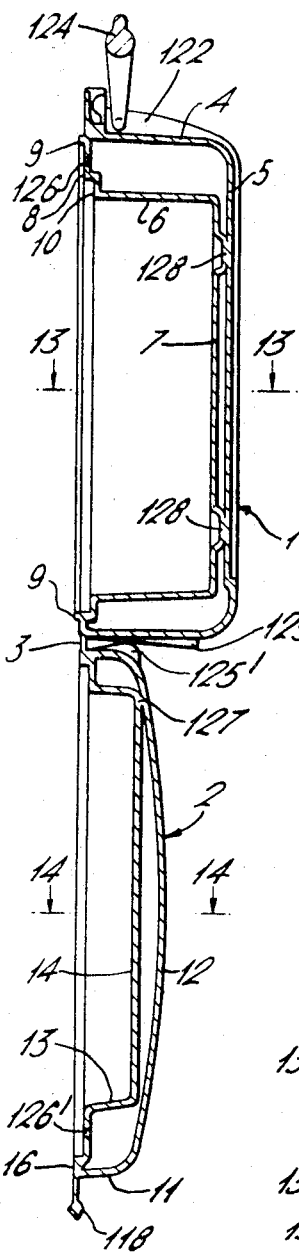
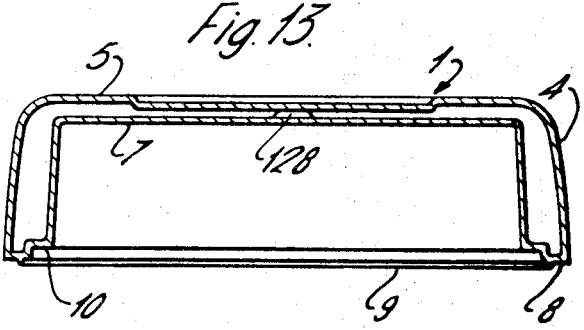
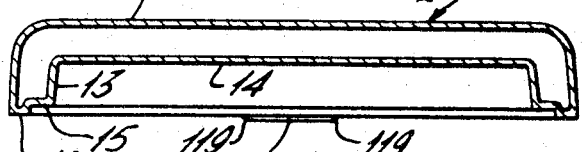
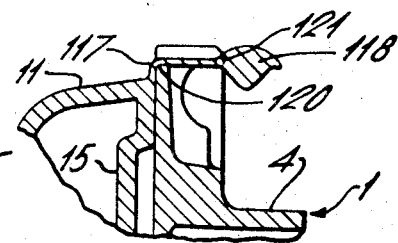
INVENTORS
PETER T. SCHURMAN
RAYMOND C. CONFER
BY *Edward J. Hanson Jr.*
ATTORNEY

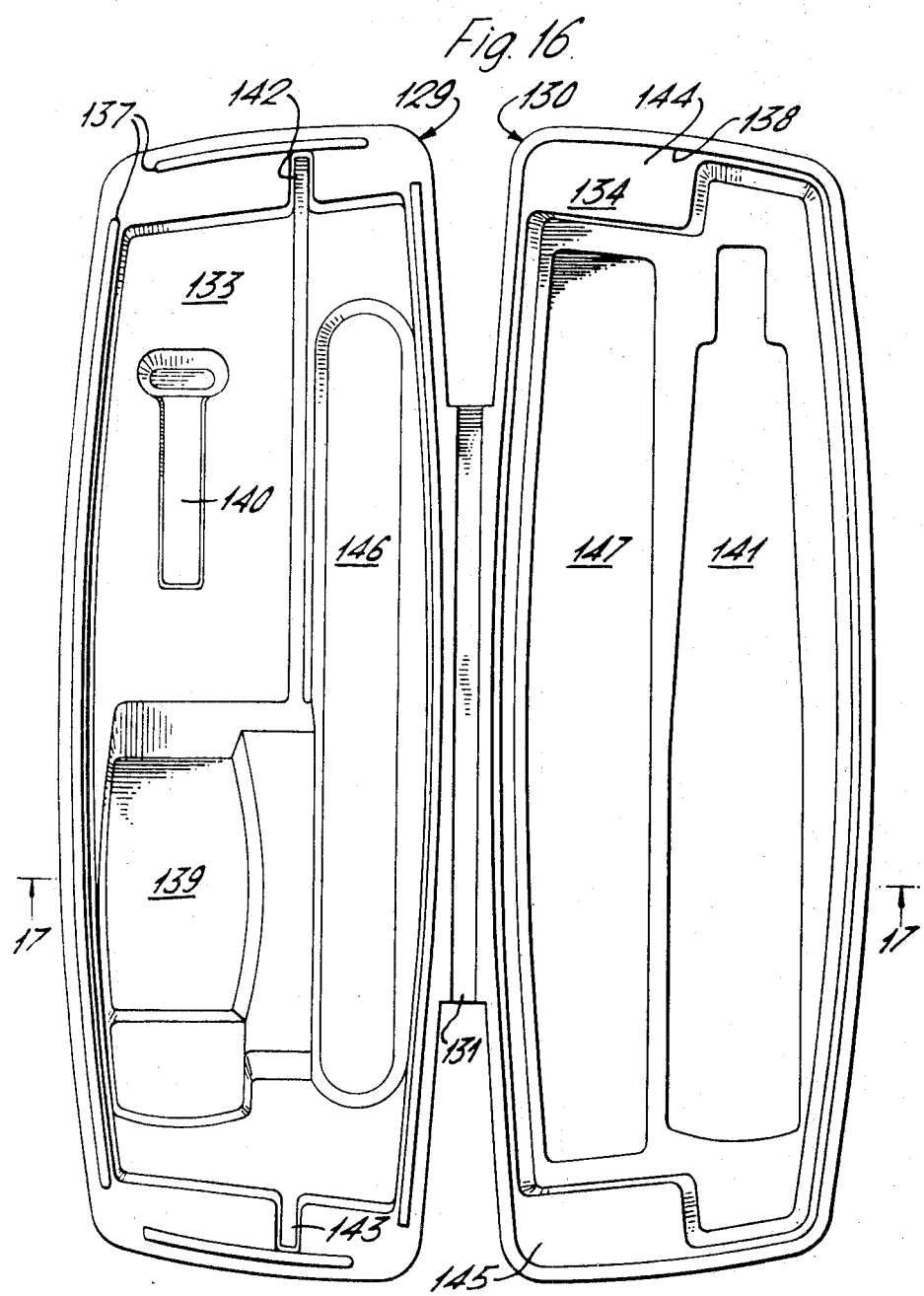

United States Patent Office 3,536,435
Patented Oct. 27, 1970

3,536,435
PLASTIC CONTAINER AND BLOW MOLDING METHOD
Peter T. Schurman, Woodbridge, Conn., and Raymond C. Confer, Gasport, N.Y., assignors to W. R. Grace & Co., Duncan, S.C., a corporation of Connecticut
Continuation-in-part of applications Ser. No. 739,972, May 27, 1968, which is a continuation of Ser. No. 395,132, Sept. 9, 1964; Ser. No. 739,974, May 27, 1968, now Pat. No. 3,441,071, which is a continuation of Ser. No. 369,159, May 21, 1964, and Ser. No. 646,770, Mar. 3, 1967, now Pat. No. 3,452,125, which is a division of Ser. No. 420,023, Dec. 21, 1964, now Pat. No. 3,317,955, which was a continuation-in-part of Ser. No. 369,159. This application Feb. 24, 1969, Ser. No. 801,620
The portion of the term of the patent subsequent to Apr. 29, 1986, has been disclaimed
Int. Cl. B65d 11/16
U.S. Cl. 150—.5                                   5 Claims

ABSTRACT OF THE DISCLOSURE

A container with a hollow walled part that has a resilient inner wall for protectively supporting an article and a relatively rigid outer wall also protecting the article.

---

This application is a continuation-in-part of our copending applications Ser. No. 739,972, filed May 27, 1968 now abandoned which is a continuation of Ser. No. 395,-132, filed Sept. 9, 1964, and now abandoned; Ser. No. 739,974, filed May 27, 1968, and now Pat. No. 3,441,-071 which is a continuation of Ser. No. 369,159, filed May 21, 1964 and now abandoned; and Ser. No. 646,770, filed Mar. 3, 1967 and now Pat. No. 3,452,125, which is a division of Ser. No. 420,023, filed Dec. 21, 1964 and now Pat. No. 3,317,955, which was a continuation-in-part of Ser. No. 369,159 listed above, all assigned to the same asignee as the present application, priority claimed to every one of the listed applications.

This invention realtes generally to the blow molding of plastic material, and more specifically to plastic containers of one-piece construction having a body part and a cover part hinged thereto.

Heretofore such containers have been injection molded, producing a one-piece construction which is relatively flimsy and relatively expensive as compared to containers using steel or other non-plastics materials. As a result, such containers have not achieved their full potential.

A primary object of our invention is to provide a hinged container formed from a single plastic tubular member, the two hinged parts being double walled envelopes having complementary portions. One side of each of the envelopes having complementary portions. One side of each of the envelopes comprising the exterior wall of the receptacle while the other side of the envelope forms the interior wall, the outer casing portions being rigid and the inner article, supporting wall portion, being flexible.

By an aspect of our invention, in one form thereof, we have provided a container having a body part and a cover part joined by a hinge continuous with each of them and connecting them for opening and closing the container. The body part, cover part and hinge are formed from a single plastic tubular member. The hinge is a pressed and fused laminate of two webs formed from opposite sides of the tubular member. The hinge is thinner than the adjacent wall area of the body and the cover part, as a result of the pressing and pinching of the hinge during its formation. At least one of the parts of the container is of hollow double wall construction with a relatively rigid outer wall and relatively flexible inner wall providing resilient support and protection for an article disposed in the receptacle. The relatively flexible inner wall is thinner than the outer wall and has a recess portion to receive an article to prevent the article's lateral displacement.

In a preferred form of the container of our invention, at least one of the parts is a box-like structure with the inner wall fitting the outer wall but spaced therefrom excepting at the marginal juncture of the walls.

In general, during manufacture of the container, thermoplastic material is extruded in tubular form. This tubular extrusion is preferably substantially of an elongated or oblong cross section and complementary mold parts are closed against the relatively flat surfaces of the extruded tube. One mold part has a pair of adjacent cavities which form the exteriors of the two parts of the receptacle and the other mold part is shaped to form the exposed surfaces of the interior walls of the receptacle parts. The parts forming the interior walls project into the cavity parts forming the exterior walls, leaving sufficient space between the molding surfaces to permit blow molding the desired double wall structure. The inner walls may thus be contoured to hold an object and prevent lateral movement. When the mold parts close, they compress the extrusion walls about the aforesaid cavities to form the meeting edges of the two receptacle parts and a unitary hinge may be molded by complementary mold parts which extend between the two cavities.

This compressing and forming forms two joined envelopes which are then inflated to assume the configurations of the mold cavities of one mold part and the exposed surfaces of the inner walls of the receptacle parts which are formed at the other mold part. The container cavities are blow molded simultaneously with the compression molding of the hinge. Because the dies pinch the plastic tube between them to form the hinge, the hinge is formed of the two layers of the plastic tube and can appropriately be described as formed of two webs (the two layers). The pinching of the pinched together two plastic webs and their compression molding causes the two webs to be composed together. The compressed air is, of course, injected independently into the two separate mold cavities and into the two closed envelopes through respective blow needles. Thus, there is provided, in one operation, a one-piece molded container utilizing blow molding to provide hollow, double wall body and cover parts while also utilizing compression molding to provide a hingle which exhibits extended flex life.

In manuafcturing one of the containers of the present invention, the aforesaid oblong extrusion is preferably formed so that one of its flat wall surfaces is substantially thinner than the other whereby, after blowing, the exterior walls of the receptacle are substantially thicker and more rigid than the interior walls.

In one form of receptacle of container, illustrated and described herein, the exterior and interior walls of both body parts are spaced and out of contact with each other at all points which define the meeting edges of the two receptacle body members.

In another embodiment of the present invention as shown herein by way of example, a portion of one of the interior walls is cut away, leaving the remainder to form a permanently covered compartment, in a manner and for purposes which will be explained more fully later herein.

3

The invention will be further described, by way of example, with reference to the accompanying drawings, wherein:

FIG. 1 is a vertical sectional view through an extrusion die of blow molding apparatus embodying the invention;

FIG. 2 is a vertical sectional view taken along line 2—2 of FIG. 1;

FIG. 3 is a bottom plan view of the die of FIG. 1;

FIG. 4 is a fragmentary detail view showing a modified extrusion die construction;

FIG. 5 is a view similar to FIG. 4 but showing a further modified die construction;

FIG. 6 is a vertical sectional view, on an enlarged scale, through molding apparatus of the present invention, showing mold sections closed about a tubular parison during the molding of a hinged container;

FIG. 7 is a schematic layout of a complete blow molding apparatus of our invention;

FIG. 8 is a side elevational view of an illustrative hinged container of our invention in closed position, the container being similar to that shown being molded in FIG. 6;

FIG. 9 is a rear elevational view of the container of FIG. 8;

FIG. 10 is a vertical sectional view taken along line 10—10 of FIG. 9;

FIG. 11 is a bottom view of the container of FIG. 8;

FIG. 12 is a view corresponding to FIG. 10, but showing the container in open position;

FIG. 13 is a sectional view taken along line 13—13 of FIG. 12;

FIG. 14 is a sectional view taken along line 14—14 of FIG. 12;

FIG. 15 is an enlarged, fragmentary sectional view through the fastener of the container of FIG. 8;

FIG. 16 is a top plan view of another embodiment of the container of the present invention in open condition showing the interior surface thereof;

FIG. 17 is a cross sectional view on the line 17—17 of FIG. 16 but with the parts in closed condition.

Referring to the drawings, there is shown apparatus for molding a hinged thermoplastic container. As shown in FIG. 6, and as described in greater detail hereinafter, the container comprises mating parts 1 and 2 joined by a hinge 3 integral therewith. Part 1 comprises a relatively deep body part of hollow, double wall construction formed by an outer shell having opposite end and side walls 4 and a bottom wall 5, and an inner shell having opposite end and side walls 6 and a bottom wall 7. Side and end walls 4 of the outer shell are joined to the side and end walls 6 of the inner shell by a peripheral flange in the form of a ledge 8 completely encircling the inner shell. An upstanding rib 9 is formed on ledge 8, for indexing purposes.

In like manner, part 2 comprises a relatively shallow top cover part of hollow, double wall construction having an outer shell formed by opposite end and side walls 11 and a bottom wall 12, and an inner shell formed by opposite end and side walls 13, and a bottom wall 14. The inner and outer side and end walls 13, 11 are joined by a peripheral flange in the form of an inwardly offset ledge 15 encircled by a skirt 16 and completely encircling the inner shell.

Of course, parts 1 and 2 can be of the same size, and part 2 can be larger or deeper than part 1, if desired.

The body and cover parts 1 and 2 are molded integrally with hinge 3, in one piece, this being accomplished by a blow molding operation as follows:

Molten plastics material, not shown, is fed into an extrusion die 17 by conventional feed means, not shown, from a suitable supply FIG. 7. The extrusion die 17, as shown in FIGS. 1 to 3, includes a die body 18 having an inlet opening 19 through one side, the opening 19 communicating with a vertical bore 20 opening downwardly through die body 18. Preferably bore 20 is not circular, as is conventional, but is laterally elongated, having generally parallel flat sides and curved ends.

4

A mandrel 21 is positioned in bore 20, the upper portion of the mandrel having a sliding fit in bore 20 and the lower portion of the mandrel having a cross sectional configuration generally concentric with body 18 around bore 20 and spaced therefrom to define a tubular extrusion passage. Mandrel 21 is positioned in bore 2 as the bolts 22 which extend through the upper end of die body 18 and are threaded into the upper end of mandrel 21 on opposite sides of a bolt valve 23 to be described. Mandrel 21 has a lateral passage 24 therethrough, comprising a continuation of inlet passage 19. Also, the upper portion of mandrel 21 has downwardly opening recesses 25 of downwardly diverging side wall form on opposite sides thereof, communicating with passages 19 and 24 and with the tubular extrusion passage along the elongated sides thereof.

Raw material fed through inlet opening 19 is held at plasticizing temperature by means such as cartridge-type electric heaters 26 positioned in body 18. The heated die body causes the thermoplastic material to remain molten, and semi-fluid, and this semi-fluid material flows into the upper end of bore 20. Some of the molten material flows through the recess 25 immediately adjacent passage 19, downwardly along the near side of the mandrel, while some molten material flows through mandrel pasage 24 to the far recess 25, whereby the molten plastic material is caused to surround mandrel 21 and move downwardly therealong. The lower portion of mandrel 21 is spaced from the side wall of the bore 20 to define a tubular extrusion passageway which fills with the molten thermoplastic material to extrude a tubular parison 27 of laterally elongated, flat-sided form.

The extrusion of a laterally elongated, flat-sided parison offers many advantages. Such a tube tends to be non-directional, unlike a circular tube, and furthermore has the approximate shape of the container to be molded as shown in FIG. 6. If a circular tube were used, an undesirably large diameter often would be required.

The flow of molten plastic material through the mandrel passage 24 can be regulated by a bolt valve 23 which is threaded in the upper end of the die body 18. Bolt 25 has a rotary valve end 28 extending through the upper end of mandrel 21 into the passage 24 for variably restricting the same.

The cross-sectional shape and wall thickness of the parison 27 is determined by a plate 29 mounted on the lower end of mandrel 21 which is recessed immediately above the plate, as indicated 30. Plate 29 is secured to mandrel 21 as by screws 31, whereby it can be detached and replaced by a plate of different configuration. In this way, parisons of different wall thicknesses can be extruded from a single die 17.

Instead of a removable plate 29 co-acting with a fixed wall of bore 20, the lower end of the mandrel can be fixed and permanent, with the die body having a removable insert 32 forming the lower end of the bore wall as shown in FIG. 4. Insert 32 can be detachably secured in place as by bolts 33 for replacement by an insert of different configuration to provide an extrusion of different side wall form.

Plate 29 and insert 32 can be designed to provide an extrusion having different wall thicknesses therearound. In FIG. 3, for example, one side, 32', of the extrusion passage is approximately twice as wide or thick as the opposite side, 33'. In addition to providing opposite side walls of different thicknesses, a given side wall can have portions of different thicknesses by appropriately recessing or embossing either the removable plate 29 or the removable rim (insert 32).

Also, the extruded parison 27 can be provided with axially spaced sections of different thickness. This can be accomplished, for example, by providing a die body 18' (FIG. 5) having an undercut inner wall 34 at the lower end of extrusion bore 20'. The mandrel 21' has a plate 29' which can be detachable and which projects beneath the overhang of wall 34. By providing the mandrel with lift jacks as indicated (35) (FIG. 7) actuated by hydraulic-pneumatic, or other forms of motor, indicated at 36, the mandrel can be raised and lowered to vary the spacing between the plate 29′ and wall 34. This will vary the wall thickness of the parison as it is extruded. The extruded parison 27 is passed between paired mold sections generally designated 37, 38 which are mounted for movement into and out of engagement about parison 27. Mold sections 37, 38 can be pivotally mounted or otherwise supported and can be moved by conventional drive means 39.

Mold section 37 comprises a plate section having a body 40 and removable cores 41, 42. Core 41 is mounted in a recess in body 40, the portions of the core projecting from body 40 having surfaces defining the inner wall, ledge and rib portions 6, 7, 8, 9 and 10 of the inner shell of container body part 1. Core 42 is mounted in another recess in body 40, and its projecting surfaces are formed to define the inner shell portions 13, 14 and 15 of container cover part 2. Mold section 38 is recessed to define the outer shell portion of container parts 1 and 2.

Thus, mold sections 37 and 38, when engaged, define a pair of cavities. One cavity has the shape of one container part; the other cavity has the shape of the other container part. Mold section 38 defines the outer shell configuration of the molded article, and mold section 37 the inner shell configuration thereof. The configuration of either inner shell can be changed without changing the configuration of the other and without changing either outer shell configuration. This is accomplished by removing the appropriate cores 41 and 42 which are simply bolted in place through body 40, from behind, and replacing it with another core having the desired configuration.

Mold section 38 and body 40 are provided with opposed land portions 43 and 44, respectively, which are arranged to pinch the parison between them, welding the opposite side walls of the parison together and forming the hinge 3. Mold section 38 also is provided with a knife edge formation 45, extending completely around the cavities, except at the hinge, and adapted to engage against the mold body 40 as a bed plate for pinching and severing the enclosed parison portion.

Thus, upon closing mold sections 37 and 38 about the parison 27, a portion thereof is enclosed. The mold sections pinch off the enclosed portion, and simultaneously pinch form the hinge 3, thereby dividing the enclosed parison portion into a pair of hollow sections positioned within the mold cavities and separated by hinge 3. Mold section 37 carries means for introducing expansion fluid into each hollow parison section, such means comprising a pair of needles 46 which are mounted in section 37 and project beyond the cavity defining faces thereof through the wall of the enclosed parison. A source of compressed air is connected via conduit 47 to each needle 46, for introducing compressed air into each of the hollow parison sections, thereby expanding them into engagement with the cavity walls, causing the parison sections to assume the shape of the cavities. Cores 41, 42 and the mold 38 are cooled, as by cooling water ducts 48 connected to a suitable source of cooling fluid. This cools and sets the molded plastic, causing it to retain the mold configuration.

Thus, by utilizing the described apparatus it is possible to obtain a one-piece container of plastic material having mating parts joined by an integral hinge, all in a single blow-molding operation.

Where a single wall construction is desired, the inner shell of either part 1 or part 2 can be either wholly or partially removed, as by severing with a circular cutting saw. Preferably, this is done by cutting through the side and end walls on 6 or 13, as the case may be.

In addition to forming the hinge 3, mold sections 37 and 38 can be arranged to form a fastener tongue 117 having an enlarged head 118 and a flange 61 corresponding to the flange 120 and adapted for interlocking engagement with the fastener tongue 117.

The plastics parison can be pinched very thin by the knife edge 45 easily and without using great force. The mold body 40 may be heated, as by cartridge heating elements 49, in the area against which the knife edge formation 45 engages. The heated body 40 maintains the parison at or near its plasticising temperature and therefore in a molten, semi-fluid condition at the area of pinching, as the mold sections close, whereby the weight of the molds themselves is sufficient to cut almost through the plastic material. This is accomplished during the blow molding operation, without requiring special cutting equipment or the large force required to pinch off cooled plastic material.

A hinge of long flex life may be provided, notwithstanding the cooling of the expanded parison sections in the mold. The flex life of the hinge may be enhanced by heating the land 44 to a temperature maintaining the pinched hinge web in a semi-fluid condition long enough to relieve stresses and strains set up in the pinched hinge web.

It will be noted that mold section 37 is shown simultaneously heated in part and cooled in part. Therefore, cores 41 and 42 are substantially insulated from body 40. This is accomplished by bevelling or tapering the side wall portions of the cores 41 and 42 away from the side walls of the recesses in which they are seated, as shown at 50, and by spacing the inner faces of the cores from the bottom walls of the recesses, thereby providing insulating dead air spaces between body 40 and the core portions seated in the recesses. Further, the spaces between the inner faces of cores 41 and 42 and the bottom walls is filled with heat insulating and/or dissipating spacing material, such as the wire screening 51. As a result, cores 41 and 42 contact body 40 only adjacent to the outer edges of the recesses, and the desired heating of body 40 does not interfere with the desired cooling of cores 41 and 42.

It will be appreciated that the illustrated arrangement of cooling ducts 48 and heaters 49 is schematic, and that the same are provided in sufficient numbers and at proper locations to achieve the desired result.

In the illustrated container, the inner shells of parts 1 and 2 approach the outer shells, thereof, very closely. Indeed, they are welded together at spaced locations 52 for added reinforcement, although this need not necessarily be done. Where welding is desired, the cores 41 and 42 are shaped accordingly. However, a problem of undesired welding together arises because of the close positioning of the inner and outer shells. There is a tendency for the parison portions 5 and 12 to fall away from the mold 38 and collapse against portions 7 and 14 as the mold sections close about the parison. If this occurs, at any point, the opposite wall portions of the parison weld together, preventing subsequent expansion in the mold cavity. Therefore, means are provided for controlling those portions of the parison intended to engage the recessed cavity faces, the opposite parison portions being maintained under control by the projecting cores 41 and 42.

The desired control is provided by evacuating or withdrawing air from between the cavity faces of mold section 38 and the adjacent wall sections of the enclosed parison. This can be accomplished in various ways. In the illustrated embodiment, air is withdrawn from between the wall section 12 and the adjacent cavity face of mold section 38 through vacuum passages 53 which are of extremely small diameter, for example .03 inch, and which communicate with a manifold passage 54 through the mold section 38. Manifold passage 54 communicates with an appropriate source of suction through a conduit 55. In the case of the outer shell of container part 1, the wall portion 5 thereof is defined in part by a removable insert plate 56 mounted on the mold section 38 from behind, as by bolts or the like. Plate 56 is provided with a slight clearance therearound, between it and the surrounding portion of mold section 38, this clearance being indicated at 57, and being on the order of .01 inch. The rear face of plate 56 is provided with transverse grooves extending between the opposite edges thereof, in generally right angular relation, as indicated at 58 and 59, for placing the clearance 57 in communication with the manifold passage 54, through the connecting passage 60.

Thus, as the mold sections 37 and 38 are closed about the parison, air is withdrawn from between the parison and the cavity faces of mold section 38. A strong suctional source is not essential. All that is required is to relieve the pressure of air trapped between the parison and the cavity faces of mold section 38, which trapped air otherwise prevents the parison from following the contour of the mold section 38 as the mold sections are engaged about the parison. The clearance space 57 and passages 53 are so small as to preclude the passage of plastic material therethrough, while being sufficient to permit the desired withdrawal of air. Such withdrawal takes place as the mold sections 37 and 38 close about the extruded parison, prior to the introduction of expansion fluid through needles 46. The introduction of expansion fluid causes the parison envelopes to expand into conformance with the surface defining faces of their respective cavities, undesired inward collapsing of the parison wall being avoided by such expansion. Also, it will be appreciated that the oblong, flat sided shape of the parison, approximating the outline configuration of the container in its open position, assists in providing a controlled expansion of the hollow parison sections within the cavities.

The feeding of the raw plastics material, the opening and closing of the mold sections and the heating and cooling thereof, the withdrawal of air from between the parison and mold section 38 and the introduction of expansion fluid all are controlled by suitable programming means, which also can control the lifting and lowering motor 36 connected to the extrusion die mandrel. Such controls are conventional, in and of themselves, and therefore are only schematically indicated in FIG. 7.

A suitable container for manufacture by the above described method and apparatus will now be described with reference to FIGS. 8 to 15 of the accompanying drawings. This container comprises mating parts 1 and 2 joined by a relatively thin connecting hinge 3 integral therewith. Part 1 comprises a relatively deep body part of hollow, double-wall construction formed by an outer shell having opposite end and side walls 4 and a bottom wall 5, and an inner shell having opposite end and side walls 6 and a bottom wall 7. Side and end walls 4 of the outer shell are joined to side and end walls 6 of the inner shell by a peripheral flange in the form of a ledge 8 completely encircling the inner shell. An upstanding rib 9 is formed on ledge 8, for a purpose to be described.

In like manner, part 2 comprises a relatively shallow top cover part of hollow, double-wall construction having an outer shell formed by end and side walls 11 and a bottom wall 12, and an inner shell formed by end and side walls 15 and a bottom wall 14. The inner and outer side and end walls 13, 11 are joined by a peripheral flange in the form of an inwardly offset ledge 15 encircled by a skirt 16 and completely encircling the inner shell.

Of course, parts 1 and 2 also can be of the same size, and part 2 can be larger or deeper than part 1, if desired.

Body and cover parts 1 and 2 are molded, integral with hinge 3, in one piece, and in a manner imparting great flex endurance to hinge 3 while providing the hollow, double-wall construction of parts 1 and 2. This is accomplished by blow-molding parts 1 and 2 and compression molding hinge 3 in one operation. To this end, the container is molded with the parts positioned as shown in FIG. 12, the handle being added later.

As previously described, molten plastic material is extruded in tubular form between mating die parts which then are brought together to pinch the plastic tube at its upper and lower ends, whereupon air under pressure is introduced into the closed tube to force it outwardly against the die parts. However, whereas the tube of molten plastic normally is pinched closed only at its ends, in the present instance the tube also is pinched closed between its ends, to define and compression mold the hinge 3. The tube is compressed completely thereacross at three locations spaced therealong.

The mating die parts are arranged so that one die part defines the outer shells 4, 5 and 11, 12 while the other die part defines the inner shells 6, 7 and 13, 14. These portions of the container, together with parts 8, 9, 10, 15 and 16, are formed by blow molding. compressed air being introduced into the container parts 1 and 2 through needle openings 126 and 126' respectively, the location of which is not critical. The coating die parts, in addition to defining spaced cavities for blow molding the container parts, pinch the plastic tube at the hinge and thereby compression mold hinge 3.

Any thermoplastic material having the requisite flexibility for hinge 3 can be used, high density polyethylene, polypropylene, polyvinyl and elastomeric polyolefin being examples of suitable materials.

The ledge 8 provides a shelf imparting, in conjunction with inner shell 6 and 7 substantially rigidly to body 1. In like manner, ledge 15, together with inner shell 13 and 14 imparts substantial rigidity to cover 2. For increased rigidity, the corners of the inner shells can be made to contact the outer shell, and can be joined thereto, as indicated at 127 in FIGS. 11 and 12. Also, the inner and outer shells can be welded at selected points as shown at 128 in FIG. 12. In this way the flimsiness characteristic of conventional, single shell moulded plastic containers is avoided.

The hollow, double-wall construction of the container parts also provides a protective cushion for the contents of the container. The shock resistance of such construction affords a degree of protection not available with conventional single shell construction.

Where buoyancy is desired, as in fishing tackle boxes, either body part 1 or cover 2, or both can be made fluid tight by sealing the needle holes 126, 126'.

Where it is desired to provide a separate insert, the inner shell 6 and 7 of the body part 1 can be either partially or wholly removed, as indicated by the broken line showing thereof in FIG. 10. This can be done by cutting, preferably through side and end walls 6 is a plane parallel to ledge 8, FIGS. 12 and 13. This hides the cut, and also leaves a portion of wall 6 for added rigidity. In this respect, it will be noted that ledge 8 continues to impart rigidity to the body part, even with the inner shell removed. An inwardly offset shoulder 10 can be provided to receive and support an insert, not shown.

If desired, the inner shell of cover 2 can be removed, preferably in like manner. Of course, where the inner shell is to be removed, it will be joined to the outer shell as shown (127 and 128).

Hinge 3, being compression molded, has a long flex life, and will withstand repeated opening and closing of the container for as long as the container is used. In closed position, skirt 16 of cover part 2 rests against ledge 8, in encircling relation to rib 9 which helps maintain parts 1 and 2 aligned when they are closed.

Extending from cover part 2, opposite hinge 3 and in the plane of skirt 16, is a fastener tab or tongue 117 terminating at its outer end in an enlarged head 118 having ears 119 projecting laterally beyond the opposite sides of tongue 117.

Body part 1 has a flange 120 projecting laterally outwardly along tongue 117 to a point between fastener head 118 and the juncture of tongue 117 and side wall 11. Undercut shoulders 121 are formed on the side of flange 120 opposite tongue 117, and project beyond flange 120 in alignment with ears 119.

When container parts 1 and 2 are brought together, to the closed position shown in FIG. 8, the fastener tongue 117 is rolled over the cam surface of flange 120, and ears 119 snap over and beneath undercut shoulders 121, releasably to hold the container closed. Fastener tongue 117, with its head 118 and ears 119, is compression molded in the same manner and at the same time as hinge 3, thereby has a long flex life. The flex life of tongue 117 is extended by the provision of flange 120 which causes the tongue to flex along a line spaced from its juncture with wall 11 instead of at that juncture.

The outer shell of body 1 may be recessed, at its end opposite hinge 3, as indicated at 122, the opposite side walls of the recess being apertured to receive pintles 123 projecting laterally from the opposite ends of a handle 24. The opposite end of the outer body shell may be molded to provide a pair of tapered feet 125, the outer extremities of which are spaced from wall 4 a distance slightly greater than the projection of hinge 3 from walls 11 and 4 when the container is closed. Similar feet 125', or a single foot, may be molded into the outer cover shell. These feet support the closed container in an upright position and prevent the weight of the container and its contents from resting on the hinge.

Flange 120 and undercut shoulders 121 are compression molded in body part 1, and recess 122 and feet 125 and 125' are blow molded therein, at the time body part 1 is formed.

In another embodiment of the present invention, the receptacle or container shown in FIGS. 16 and 17 comprises a pair of box-like complementary body members designated generally 129 and 130 which in the illustrated instance are molded integrally to include a relatively thin connecting hinge portion 131. For convenience of reference the member 129 may be considered to be the bottom member and the member 130 the top or cover member.

The body member 129, as is clearly shown in FIG. 17, comprises a blown hollow structure which includes a relatively rigid outer wall 132 and an inner wall 133 which is substantially thinner than outer wall 132 and is accordingly substantially more flexible. The body member 130 likewise includes a relatively rigid outer wall portion 135 and a thinner inner wall portion 136 which is substantially more flexible than the outer wall portion 135.

It will be noted by reference to FIG. 17 that in the case of both of the body members 129 and 130, the blowing of the inner and outer wall portions thereof produces interfitting marginal edge formations designated 137 and 138, respectively, which formations occur generally along lines which define the meeting edges of the respective outer and inner wall portions of the body members.

The containers may be designed to receive a variety of articles, the container being arranged particularly to receive specific articles or pieces of equipment or as general carryall containers. In the present instance the container, merely by way of example, is designed to receive an electric carving knife which conventionally includes a body member which includes a handle portion and electric motor means contained therein, the knife blade per se being normally separated from the handle portion when the device is not in use.

Referring particularly to FIG. 16, the inner wall 133 of the bottom body member 129 is provided with a pair of depressed well formations 139 and 140 which receive portions of the body or holder member of the electric carving knife and the inner wall 136 of upper body member 130 is provided with a depressed well formation 141 which seats over the opposite side of the body member of the knife, whereby such body member, which is indicated in dot and dash lines at A in FIG. 17 is securely held between the respective well formations of the members 129 and 130 when the container is closed. Any desired form of clasping or latching means may be provided for holding the container body members 129 and 130 in relatively closed position, as for instance the latch means previously described with reference to FIGS. 8 to 15.

The knife blades which are separable from the knife holder are adapted to seat in recesses 142 and 143 in lower body member 129, and elevated surface portions 144 and 145 of inner wall 136 of upper body member 130 seat against the knife blades when the container is closed to hold them firmly in position. A further well portion 146 in lower body member 129 may receive the electrical cord which extends from the knife body member and the numeral 147 designates a relatively shallow recess in inner wall 136 of the upper body member 130 which in the present instance merely receives labelling indicia.

It will be seen from the foregoing that the knife body member indicated as A is in a sense resiliently suspended between the rigid outer walls 132 and 135 by the relatively more flexible inner walls 133 and 136 so that a floating mounting for the body member A is provided which is calculated to protect the same against jarring or shock to which the container generally may be subject at times.

From the foregoing, it can also be seen that with the container and method of our invention the interior of the container can be varied independently of its exterior, and vice versa. This is accomplished by changing the appropriate die part, which can be done because of the blow molding of parts 1 and 2. Indeed, either the interior or the exterior of only one of parts 1 and 2 can be varied, if desired. All of this can be done while still providing the compression molded hinge 3.

We claim:

1. In a container, the combination of a body part; a cover part; and a hinge continuous with said body part and said cover part and connecting said parts for opening and closing thereof, said body part, cover part and hinge being formed from a single plastic tubular member, said hinge comprising a pressed laminate formed from opposite sides of said tubular member, said laminate being thinner than the adjacent wall areas of said body part and said cover part from the pressing thereof and at least one of said parts being of hollow double wall construction and comprising a relatively rigid outer wall and a relatively flexible inner wall whereby an article disposed in said receptacle is resiliently supported.

2. The receptacle of claim 1 wherein both of said parts are of hollow construction comprising a relatively rigid outer wall and a relatively flexible inner wall and wherein at least one of said inner walls has a recess portion to receive an article and prevent lateral displacement of said article.

3. The receptacle of claim 1 wherein said part with the relatively flexible inner wall comprises a box-like structure with the inner wall fitting within the outer wall but spaced therefrom excepting at the marginal joinder of said walls.

4. The receptacle of claim 1 wherein said inner wall is thinner than said outer wall.

5. The receptacle of claim 1 wherein said hinge comprises a fused laminate of two webs of said thermoplastic material.

References Cited

UNITED STATES PATENTS 3,441,071  4/1969  Schurman et al. _____ 150—.5

FOREIGN PATENTS 654,579  6/1963  Italy.

DONALD F. NORTON, Primary Examiner

U.S. Cl. X.R.

206—4; 220—9